United States Patent
Chassaigne et al.

(10) Patent No.: US 11,381,074 B2
(45) Date of Patent: Jul. 5, 2022

(54) ELECTRICAL PROTECTION SYSTEM AND METHOD FOR A HIGH-VOLTAGE DIRECT CURRENT SYSTEM

(71) Applicant: Airbus SAS, Blagnac (FR)

(72) Inventors: Didier Chassaigne, Blagnac (FR); Jean Rivenc, Blagnac (FR); Richard Perraud, Blagnac (FR)

(73) Assignee: Airbus SAS, Blagnac (FR)

( * ) Notice: Subject to any disclaimer, the term of this patent is extended or adjusted under 35 U.S.C. 154(b) by 6 days.

(21) Appl. No.: 16/936,610

(22) Filed: Jul. 23, 2020

(65) Prior Publication Data

US 2021/0036509 A1  Feb. 4, 2021

Related U.S. Application Data

(60) Provisional application No. 62/882,007, filed on Aug. 2, 2019.

(30) Foreign Application Priority Data

Oct. 16, 2019  (FR) ....................... 1911503

(51) Int. Cl.
  *H02H 7/26* (2006.01)
  *B64D 43/00* (2006.01)
  *H02H 1/00* (2006.01)

(52) U.S. Cl.
  CPC ............. *H02H 7/268* (2013.01); *B64D 43/00* (2013.01); *H02H 1/0007* (2013.01)

(58) Field of Classification Search
  CPC ....... H02H 7/268; H02H 1/0007; B64D 43/00
  USPC .......................................................... 363/35
  See application file for complete search history.

(56) References Cited

U.S. PATENT DOCUMENTS

| | | | | |
|---|---|---|---|---|
| 8,498,732 B2* | 7/2013 | Gass | .................... | B23D 59/006 |
| | | | | 700/177 |
| 2018/0323602 A1* | 11/2018 | Oms | ........................ | H03K 5/24 |
| 2020/0203943 A1* | 6/2020 | Shen | .................... | H02H 1/0007 |
| 2021/0285997 A1* | 9/2021 | Jarmolowitz | ......... | B60R 16/033 |

* cited by examiner

Primary Examiner — Yemane Mehari
(74) Attorney, Agent, or Firm — Greer, Burns & Crain, Ltd.

(57) ABSTRACT

An electrical protection system protects a high-voltage DC electrical installation and comprises at least one sensor of first type configured to perform measurements of a non-electrical physical quantity, at least one sensor of second type configured to perform measurements of an electrical physical quantity, and a control unit connected to said at least one sensor of first type and to said at least one sensor of second type. The control unit commands a circuit breaker of the high-voltage DC electrical installation to open when, in a sliding time window, an abnormal non-electrical phenomenon is detected by virtue of the measurements of said at least one sensor of first type and when, furthermore, an abnormal electrical phenomenon is detected by virtue of the measurements of said at least one sensor of second type.

11 Claims, 3 Drawing Sheets

ELECTRICAL PROTECTION SYSTEM AND METHOD FOR A HIGH-VOLTAGE DIRECT CURRENT SYSTEM

RELATED APPLICATIONS

This application claims priority to U.S. Provisional Patent Application No. 62/882,007 filed Aug. 2, 2019, and to French Patent Application No. 1911503, filed Oct. 16, 2019, the entireties of both of which are incorporated herein by reference.

TECHNICAL FIELD

The present invention relates to a method and system for protecting an electrical installation for transmitting high-voltage direct current (HVDC) to at least one piece of electrical apparatus, so as to supply said at least one piece of electrical apparatus with electrical power securely.

BACKGROUND

An electrical installation, for example such as installed in an aircraft, conventionally comprises at least one electrical power source connected to at least one piece of electrical apparatus in order to supply said at least one piece of electrical apparatus with electrical power. The electrical installation comprises at least one electrical line formed from an electrical conductor covered with an insulating sleeve. The electrical line furthermore comprises a circuit breaker configured to monitor electrical parameters of signals routed over the electrical conductor between said at least one electrical power source and said at least one piece of electrical apparatus. The circuit breaker is furthermore configured to cut the electrical supply to said at least one piece of electrical apparatus when the monitored electrical parameters indicate the presence of an over-current or of a short-circuit current in the electrical conductor.

In the case of aircraft, consumption of electrical power has significantly increased because of the increasing demand for power by electrical devices (e.g. laptops, tablets, avionics, etc.) located on board. This tendency is inevitably leading to an increase in the voltage levels of the electrical supply systems of aircraft, which were conventionally 115 volts AC (AC standing for alternating current) and 28 volts DC (DC standing for direct current). Voltages of about +/−270 volts DC, or even +/−540 volts DC, are now being envisaged. High-voltage direct current (HVDC) is then spoken of. These high voltage values cause new electrical-protection problems. For example, electric arcs may occur when the current leaks from the electrical line. An electric arc between an electrical conductor supplying electricity to at least one piece of electrical apparatus and the fuselage of an aircraft, which is conductive, or between two adjacent electrical conductors, could damage said at least one piece of electrical apparatus.

The prior-art circuit breakers are not optimized for securing power transmission via electrical links using voltages that are so high. Specifically, at high voltage, with the prior-art circuit breakers, it is necessary to respect large safety distances between a sheath containing electrical-supply cables and the fuselage of the aircraft, or between a sheath containing supply cables and another sheath containing data-transmission cables, in order to prevent a potential electric arc in the sheath containing supply cables from damaging, via a thermal effect, the fuselage of the aircraft or the data-transmission cables. These safety distances place stringent spatial constraints on the design of aircraft, this increasing their size and their fuel consumption.

It is desirable to completely or partially mitigate the aforementioned drawback of the prior art. There is therefore a need for a device for electrically protecting an electrical line that ensures a secure supply of HVDC electrical power to at least one piece of electrical apparatus. It is in particular desirable to provide a solution that is applicable to the electrical protection of electrical installations of vehicles, especially aircraft.

The patent document U.S. Pat. Pub. No. 2018/323602 discloses an electrical protection system intended to protect an electrical line designed to connect an HVDC power source to a piece of electrical apparatus. The electrical line comprises an electrical conductor encircled by an insulating cover and an electrical protection device comprising:
  a conductive sleeve placed around the insulating cover;
  a biasing module configured to bias the conductive sleeve with a voltage (of constant and pre-set value);
  a circuit breaker arranged on the conductive sleeve and configured to cut, on command, a current flowing through the electrical conductor; and
  a detection module connected to the conductive sleeve and configured to detect a current leak from the electrical conductor (detected via a voltage value of the conductive sleeve exceeding a predefined threshold) and to order the circuit breaker to cut the current flowing through the electrical conductor in case of detection of a current leak.

Such a system, which is referred to as "High Voltage Enhanced Protection" or HVEP, is an effective way of detecting an anomaly in an electrical line. Although it is assumed to be effective for the intended purposes, it would be desirable to be able to detect an anomaly anywhere in the electrical installation, and not solely in the electrical conductor, such as an anomaly that could be the cause of a future electric arc.

SUMMARY OF THE INVENTION

The present invention relates to an electrical protection system intended to protect a high-voltage DC electrical installation, the electrical protection system comprising: at least one sensor of first type, configured to perform measurements of a non-electrical physical quantity; at least one sensor of second type, configured to perform measurements of an electrical physical quantity; and a control unit connected to said at least one sensor of first type and to said at least one sensor of second type. The control unit comprises electronic circuitry configured to command a circuit breaker of the high-voltage DC electrical installation to open when, in a sliding time window, called sliding window SW3, an abnormal non-electrical phenomenon is detected by virtue of the measurements of said at least one sensor of first type and when, furthermore, an abnormal electrical phenomenon is detected by virtue of the measurements of said at least one sensor of second type. Thus, an anomaly anywhere in the electrical installation is easily detected and the formation of electric arcs may easily be prevented.

According to one particular embodiment, the control unit comprises a first controller connected to each sensor of first type, the first controller taking the form of electronic circuitry configured to, in a phase of surveillance of each sensor of first type: perform an acquisition of values measured by each sensor of first type; determine the difference, called signal Delta T1, between the values acquired by each sensor of first type and a reference measurement; decide to generate an event internal to the control unit when, for at least one said sensor of first type, the signal Delta T1 exits a normal envelope, the normal envelope defining the variability of the signals captured by said sensor of first type in nominal operation of the high-voltage DC electrical installation; and decide to generate an event external to the control unit when the number of internal events generated by the first controller during a sliding time window, called sliding window SW1, reaches a predefined number N1.

According to one particular embodiment, a different external event is generated depending on whether the number N1 of internal events generated during the sliding window SW1 is reached by virtue of a single sensor of first type or via a plurality of sensors of first type.

According to one particular embodiment, the control unit comprises a second controller connected to each sensor of second type, the second controller taking the form of electronic circuitry configured to, during a phase of surveillance of each sensor of second type: perform an acquisition of values measured by each sensor of second type; determine the difference, called signal Delta T2, between the values acquired by each said sensor of second type and a reference measurement; decide to generate an event internal to the control unit when, for at least one said sensor of second type, the signal Delta T2 exits a normal envelope, the normal envelope defining the variability of the signals captured by said sensor of second type in nominal operation of the high-voltage DC electrical installation; and decide to generate an event external to the control unit when the number of internal events generated by the second controller during a sliding time window, called sliding window SW2, reaches a predefined number N2.

According to one particular embodiment, the control unit controls the circuit breaker to open when a said external event is generated by the second controller.

According to one particular embodiment, the control unit comprises a third controller connected to the first controller and to the second controller, the third controller taking the form of electronic circuitry configured to: receive the internal events generated by the first controller; receive the internal events generated by the second controller; decide to generate an event external to the control unit when, during the sliding window SW3, at least one internal event is generated by the first controller and at least one internal event is generated by the second controller, and when, furthermore, their sum, in said sliding window SW3, is higher than or equal to a predefined number N3.

According to one particular embodiment, the electrical protection system comprises at least two sensors of first type detecting non-electrical phenomena of different natures.

The present invention also relates to an aircraft comprising a high-voltage DC electrical installation equipped with an electrical protection system, such as mentioned above, in order to protect said high-voltage DC electrical installation.

The present invention also relates to a method implemented by an electrical protection system protecting a high-voltage DC electrical installation, the electrical protection system comprising: at least one sensor of first type, configured to perform measurements of a non-electrical physical quantity; at least one sensor of second type, configured to perform measurements of an electrical physical quantity; and a control unit connected to said at least one sensor of first type and to said at least one sensor of second type. The method is such that the control unit commands a circuit breaker of the high-voltage DC electrical installation to open when, in a sliding time window, called sliding window SW3, an abnormal non-electrical phenomenon is detected by virtue of the measurements of said at least one sensor of first type and when, furthermore, an abnormal electrical phenomenon is detected by virtue of the measurements of said at least one sensor of second type.

BRIEF DESCRIPTION OF THE DRAWINGS

The aforementioned features of the invention, and others, will become more clearly apparent on reading the following description of an example embodiment, said description being given with reference to the appended drawings, in which.

DETAILED DESCRIPTION OF EMBODIMENTS

An electrical protection system is proposed that allows more complete prevention and detection of anomalies occurring in an electrical installation. The proposed electrical protection system comprises a set of sensors that are placed at various locations on the electrical installation (electrical line, connector between electrical elements, for example for connecting one electrical line and another electrical line, for connecting an electrical line and an electrical power source, for connecting an electrical line and a piece of electrical apparatus, etc.) and that use various sensor technologies. Thus, the invention more particularly pertains to the comparison of multi-physical signatures obtained via a use of sensors of various types located on connectors and/or on electrical cables.

Signatures qualified as "normal" are obtained in operating mode and for a defined environment. These signatures form part of a signal-amplitude envelope called the "normal envelope". Signatures qualified as "abnormal" are obtained in the presence of signals, i.e. representations of physical quantities measured by the sensors, that exit this normal envelope. It is thus proposed to continuously compare multi-physical signatures, for the purposes of prevention (e.g. detection of damage caused to electrical harnesses) and detection of electric arcs.

As detailed below, it is proposed to simultaneously use detection of non-priority anomalies (anomalies of "Type 1"), which are detected by virtue of sensors of Type 1, and priority anomalies (anomalies of "Type 2"), which are detected by virtue of sensors of Type 2, in order to achieve an acceptable level of robustness with respect to detection of anomalies in the electrical installation. The sensors of Type 1 are configured to perform measurements of non-electrical physical quantities and thus to allow non-electrical phenomena to be detected, whereas the sensors of Type 2 are configured to perform measurements of electrical physical quantities and thus to allow electrical phenomena to be detected.

Non-priority anomalies are anomalies detected by analyzing signals of non-electrical phenomena, which may be indicative of a current or future electrical fault, but which do not themselves alone require the electrical supply to be cut. Priority anomalies are anomalies detected by analyzing signals of electrical phenomena, which may themselves alone require the electrical supply to be cut.

Figure 1:
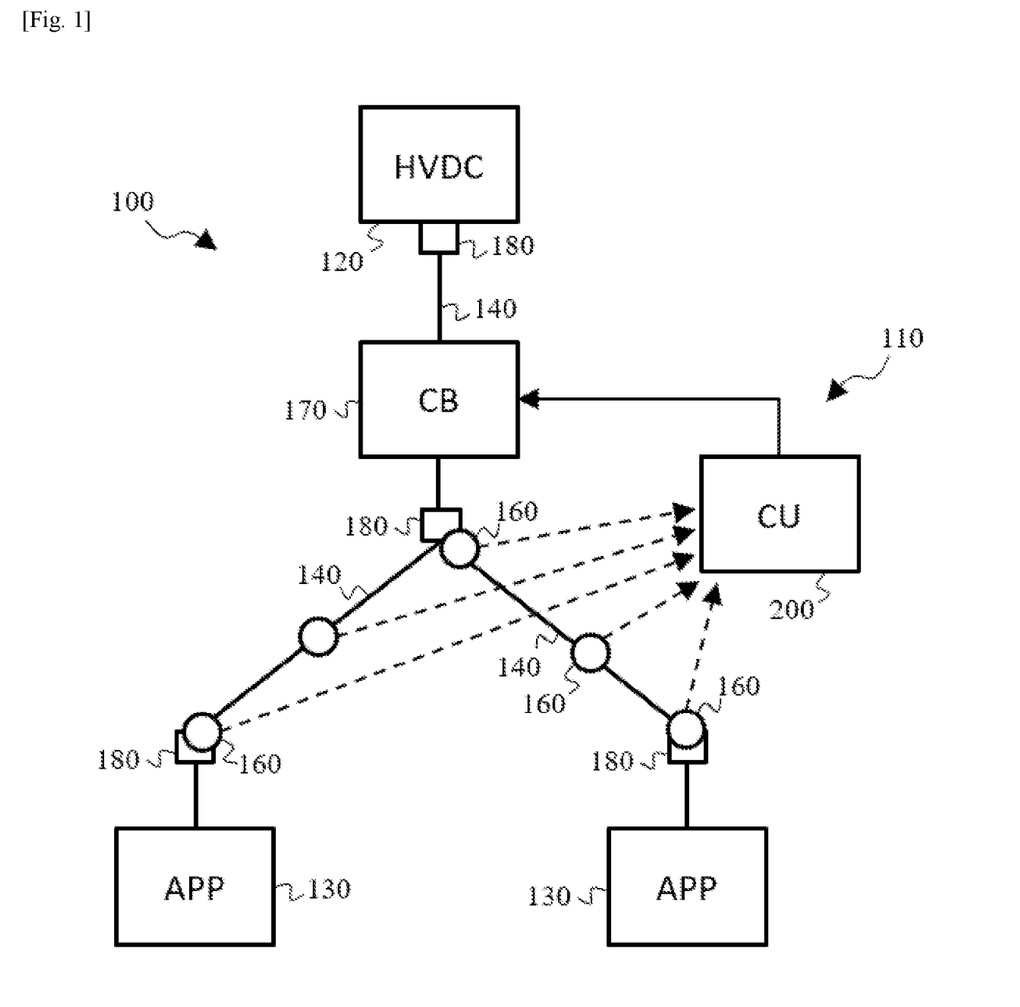
FIG. 1 schematically illustrates an electrical installation protected by an electrical protection system.

FIG. 1 schematically illustrates an electrical installation 100 protected by an electrical protection system 110. The electrical installation 100 connects an HVDC electrical power source 120 to at least one piece of electrical apparatus 130, in order to supply said at least one piece of electrical apparatus 130 with electrical power. The electrical installation 100 comprises at least one electrical line 140 formed from an electrical conductor encircled by an insulating cover, a plurality of connectors 180 that are intended to interconnect the various elements of the electrical installation 100, and an electrical protection system 110 comprising a plurality of sensors 160 of different technologies (as discussed in more detail below).

The electrical installation 100 is equipped with a circuit breaker 170 (denoted CB in FIG. 1) placed on the electrical conductor of one said electrical line, and arranged and configured to cut, on command, the HVDC electrical supply of said at least one piece of electrical apparatus 130. The circuit breaker 170 may form part of the electrical protection system 110.

The electrical protection system 110 furthermore comprises a detector 200, taking the form of a control unit (denoted CU in FIG. 1), connected to the sensors 160 and to the circuit breaker 170, and configured to prevent and detect a leak of current from the electrical installation 100 and to command the circuit breaker 170 to cut the HVDC electrical supply in certain cases (as discussed in more detail below).

The circuit breaker 170 may be of various types. Basically, the circuit breaker 170 functions as an on/off switch that, when it is tripped, opens and thus cuts the electrical current in the electrical conductor on which the circuit breaker 170 is mounted.

Figure 2:
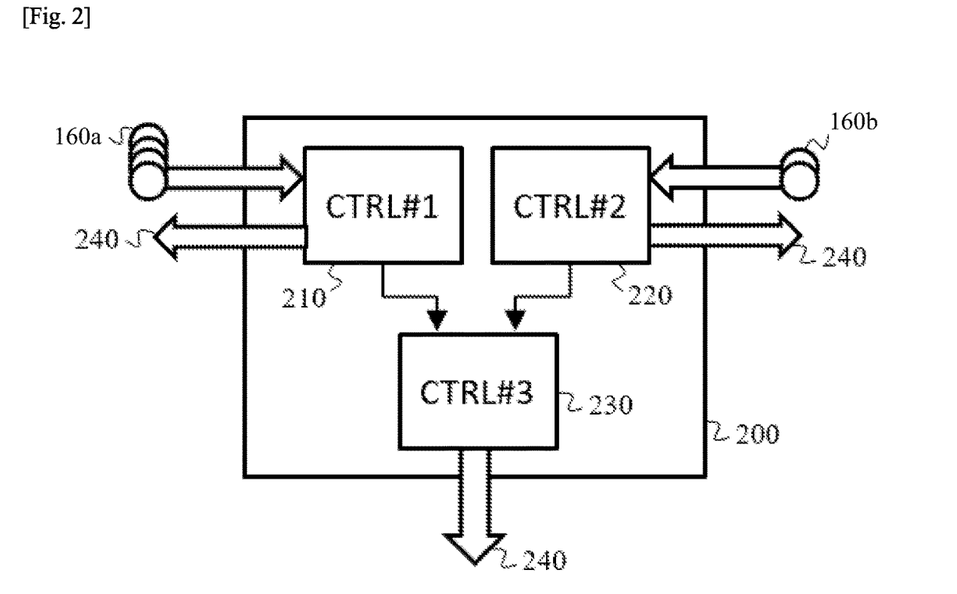
FIG. 2 schematically illustrates an arrangement of a control unit of the electrical protection system.

Such as schematically illustrated in FIG. 2, the detector 200 comprises a first controller 210 connected to each sensor 160a of Type 1 and a second controller 220 connected to each sensor 160b of Type 2, both from the plurality of sensors 160. The detector 200 furthermore comprises a third controller 230, qualified as multi-physical controller, connected to the first controller 210 and to the second controller 220, so as to receive internal events generated by the first controller 210 and internal events generated by the second controller 220. The events in question are qualified as "internal" in so far as their scope remains internal to the detector 200. In the contrary case, the events are qualified as "external" (as represented by arrows 240 in FIG. 2).

As detailed below, the first controller 210 is responsible for supervising each sensor of Type 1, and for preventing and detecting electrical anomalies sensed by at least one sensor of Type 1 via the measurement of non-electrical physical quantities; the second controller 220 is responsible for supervising each sensor of Type 2, and for preventing and detecting electrical anomalies sensed by at least one sensor of Type 2 via the measurement of electrical physical quantities; and the third controller 230 is responsible for supervising each sensor of Type 1 and each sensor of Type 2, and for preventing and detecting electrical anomalies sensed by at least one sensor of Type 1 and furthermore by at least one sensor of Type 2.

In one particular embodiment, the operations of the first controller 210, of the second controller 220 and of the third controller 230 that are described here are carried out by one and the same controller.

At least one sensor of Type 1 and at least one sensor of Type 2 are used. In one particular embodiment, at least two sensors of Type 1, which are preferably of different natures (i.e. which are suitable for detecting different non-electrical phenomena), and at least one sensor of Type 2 are used. It should be noted that certain sensors are capable of operating both as a sensor of Type 1 and as a sensor of Type 2, such as for example an optical fiber used to detect a poor connection (by forming a loop with the optical fiber between various elements in order to verify the good mechanical connection therebetween) and electrical signals. In this case, the sensor in question is considered to be a juxtaposition of a sensor of Type 1 and a sensor of Type 2 (as though there were physically two sensors instead of a single sensor).

Each sensor of Type 1 detects anomalies of the electrical installation 100 before an electric-arc event even occurs. Each sensor of Type 1 is thus configured to detect a non-electrical phenomenon via the measurement of a non-electrical physical quantity and to deliver a signal the amplitude of which is representative of the value of the measured non-electrical quantity. For example, non-exhaustively, the sensor of Type 1 allows:

connector temperature to be monitored;
prestress forces between connectors to be monitored;
infrared radiation, or more broadly radiation in another part of the radiative spectrum or in the entire radiative spectrum, to be monitored; or
sound to be monitored.

The first controller 210, which is connected to the outputs of the sensors of Type 1, is configured to perform:

a training phase with acquisition of normal envelopes in a trial environment;
an initialization phase with acquisition of a reference measurement for each sensor of Type 1; and
a monitoring phase.

During the training phase, one said normal envelope is established for each sensor of Type 1. The normal envelope defines the variability of the signals captured by said sensor of Type 1 in nominal operation of the electrical installation 100. It will be noted that the training phase may be performed in the laboratory with a protection system dedicated to the training phase, and the first controller 210 is then programmed to store in memory the characteristics of each normal envelope to be considered by said first controller 210.

The initialization phase allows the reference measurement, about which the variability of the signals measured by the sensor of Type 1 in question must be monitored, to be determined. The initialization phase preferably allows a validation of the operation of the electrical installation 100 to be performed, in particular as regards the operation of each sensor of Type 1.

The monitoring phase performed by the first controller 210 comprises:

acquiring values measured by each of the sensors of Type 1;
continuously comparing values acquired by each of the sensors of Type 1 with the reference measurement corresponding to said sensor of Type 1, the difference between the values acquired by a sensor of Type 1 and the corresponding reference measurement being called signal Delta T1;
an internal deciding phase in which a decision is made depending on the result of the comparison, for each sensor of Type 1, between the signal Delta T1 and the corresponding normal envelope; and
a robustness phase.

Figure 3:
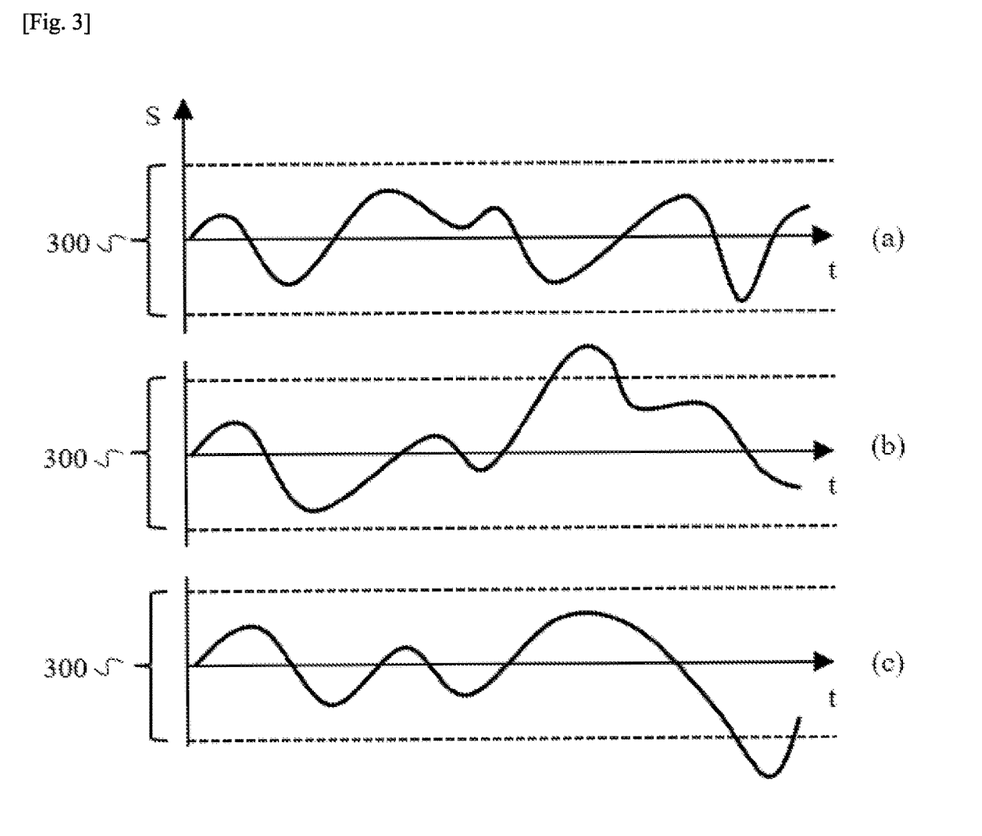
FIG. 3 schematically illustrates one example of a signal contained in an envelope, called the normal envelope, and two examples of signals that exit from this normal envelope.

In the context of the internal deciding phase, for each sensor of Type 1:
- the first controller 210 delivers a "nominal" internal signal when the signal Delta T1 remains in the normal envelope (see case (a) in FIG. 3, where a signal S is contained over time t in the normal envelope 300), i.e. conforms to the expected variability of the measurements of said sensor of Type 1;
- the first controller 210 delivers a "detection of potential damage" internal signal when the signal Delta T1 leaves the normal envelope (see cases (b) and (c) in FIG. 3, where the signal S exits from the normal envelope 300), this generating a "detection of potential damage" internal event and stopping the "nominal" internal signal; and
- the first controller 210 again delivers the "nominal" internal signal when the signal Delta T1 returns to the normal envelope.

In order to limit false detections, the robustness phase makes it possible to wait for a predefined number N1 (N1>1) of "detection of potential damage" internal events to be reached, in a sliding time window (called sliding window SW1) of predefined duration, before the first controller 210 delivers a "damage detection" external signal or event. This number N1 is for example set to 3.

The "damage detection" external signal or event triggers a dedicated alarm, which is for example transmitted to a user display or transmitted to an event logger LOG, then analyzed during maintenance operations in order to direct operations of inspection of the electrical installation 100.

In one particular embodiment, in the robustness phase, the first controller 210 delivers an "inspection required" external signal when a predefined number N1b (N1b<N1) of "detection of potential damage" internal signals is reached in said sliding window SW1 via the same sensor of Type 1. Preferably, N1b=N1. This "inspection required" external signal preferably triggers the execution of an inspection operation on the sensor of Type 1 in question, in so far as only this sensor detects an anomaly in the electrical installation 100.

In one particular embodiment, in the robustness phase, the first controller 210 delivers the "damage detection" external signal when the predefined number N1 of "detection of potential damage" internal signals is reached in said sliding window SW1 by virtue of a plurality of sensors of Type 1 (the anomaly is therefore detected by a plurality of sensors of Type 1). Thus, a different external event is generated depending on whether the number of internal events generated during the sliding window SW1 is reached by virtue of a single sensor of first type or via a plurality of sensors of first type.

Each sensor of Type 2 is used to detect the occurrence of electric arcs. Therefore, each sensor of Type 2 is configured to detect an electrical phenomenon via the measurement of an electrical physical quantity and to deliver a signal the amplitude of which is representative of the value of the measured electrical quantity. For example, non-exhaustively, the sensor of Type 2 allows:
- electrical current to be monitored (with temporal and/or spectral analysis);
- radiofrequencies to be monitored;
- a reflectometry analysis to be performed; or
- the electrical line to be monitored with an HVEP sensor such as already mentioned.

The second controller 220, which is connected to the outputs of the sensors of Type 2, is configured to perform:
- a training phase with acquisition of normal envelopes in the trial environment (phase common to the sensors of Type 1, but with sensors of different natures);
- an initialization phase with acquisition of a reference measurement for each sensor of Type 2 (phase common to the sensors of Type 1, but with sensors of different natures);
- a monitoring phase.

During the training phase, one said normal envelope is established for each sensor of Type 2. The normal envelope defines the variability of the signals captured by said sensor of Type 2 in nominal operation of the electrical installation 100. It will be noted that the training phase may be performed in the laboratory with a protection system dedicated to the training phase, and the second controller 220 is then programmed to store in memory the characteristics of each normal envelope to be considered by said second controller 220.

The initialization phase allows the reference measurement, about which the variability of the signals measured by the sensor of Type 2 in question must be monitored, to be determined. The initialization phase preferably allows a validation of the operation of the electrical installation 100 to be performed, in particular as regards the operation of each sensor of Type 2.

The monitoring phase performed by the second controller 220 comprises:
- acquiring values measured by each of the sensors of Type 2;
- continuously comparing values acquired by each of the sensors of Type 2 with the reference measurement corresponding to said sensor, the difference between the values acquired by a said sensor of Type 2 and the corresponding reference measurement being called signal Delta T2;
- an internal deciding phase in which a decision is made depending on the result of the comparison, for each sensor of Type 2, between the signal Delta T2 and the corresponding normal envelope; and
- a robustness phase.

In the context of the internal deciding phase, for each sensor of Type 2:
- the second controller 220 delivers a "nominal" internal signal when the signal Delta T2 remains in the normal envelope (see case (a) in FIG. 3);
- the second controller 220 delivers an "opening recommended" internal signal when the signal Delta T2 leaves the normal envelope (see cases (b) and (c) in FIG. 3), this generating an "opening recommended" internal event and stopping the "nominal" internal signal; and
- the second controller 220 again delivers the "nominal" internal signal when the signal Delta T2 returns to the normal envelope.

In order to limit false detections, the robustness phase makes it possible to wait for a predefined number N2 (N2>1) of "opening recommended" internal events to be reached, in a sliding time window (called sliding window SW2) of predefined duration, before the second controller 220 delivers an "open" external signal or event. The "open" external signal triggers the opening of the circuit breaker 170. This number N2 is for example set to 3.

In one particular embodiment, the sliding windows SW1 and SW2 are of the same duration.

The "open" external signal or event triggers the opening of the circuit breaker 170. The "open" external signal or event may furthermore trigger a dedicated alarm, which is for example transmitted to a user display or transmitted to an event logger LOG, then analyzed during maintenance operations in order to direct operations of inspection of the electrical installation 100.

The third controller 230 is configured to take into account, simultaneously, the sensors of Type 1 and of Type 2, and to improve the reciprocal performance of the functions for preventing and detecting electric arcs, and in particular the response time and the false detection rate (robustness phase). The third controller 230 takes into account each of the events generated by the first controller 210 and the second controller 220, independently of the robustness phases implemented by the first controller 210 and the second controller 220. Thus, the third controller 230 implements a robustness phase that is specific thereto, which phase is fed with the multi-physical character of the events that are reported thereto.

The third controller 230 implements a monitoring phase, which comprises:
acquiring internal events generated by the first controller 210 and the second controller 220; and
an internal deciding phase.

In the context of the internal deciding phase:
the third controller 230 delivers an "alarm" external signal or event when, during a sliding time window (called sliding window SW3) of predefined duration, at least one "detection of potential damage" internal event is generated by the first controller 210 and at least one "opening recommended" internal event is generated by the second controller 220, and when, furthermore, their sum, in said sliding window SW3, is higher than or equal to a predefined number N3 (N3>1); and
the third controller 230 otherwise delivers a "normal" external signal.

In one particular embodiment, the sliding window SW3 is of the same duration as the sliding windows SW1 and SW2.

The "alarm" external signal or event triggers the opening of the circuit breaker 170. The "alarm" external signal or event may furthermore trigger a dedicated alarm, which is for example transmitted to a user display or transmitted to an event logger LOG, then analyzed during maintenance operations in order to direct operations of inspection of the electrical installation 100.

For example, a first scenario may be representative of a slow physical phenomenon. A "detection of potential damage" first internal event is registered regarding the detection of a non-priority anomaly by a sensor of Type 1. If a "detection of potential damage" second internal event is registered by another sensor of Type 1 in the sliding window SW1, this event more particularly being relative to another physical vector, the first controller 210 then delivers a "damage detection" external signal or event. This type of external signal or event results in an operation of inspection of the electrical installation 100. These inspection operations consist, for example, in stopping the electrical installation 100, in diagnosing the electrical installation 100, and in consequently taking potential corrective measures (e.g. tightening or replacing connectors).

For example, a second scenario may be representative of a rapid physical phenomenon. A "detection of potential damage" first internal event is registered regarding the detection of a non-priority anomaly by a sensor of Type 1. If an "opening recommended" second internal event is registered by a sensor of Type 2 in the sliding window SW3, the third controller triggers the immediate opening of the electrical circuit via the circuit breaker 170.

Thus, the third controller 230 is capable of detecting anomalies in the electrical installation before they are detected by the first controller 210 or the second controller 220. Thus, the response time of the electrical protection system 110 is decreased. Generally, the detector 200, which acts as control unit of the electrical protection system 110, is configured to command the circuit breaker 170 to open when, in a sliding time window of predefined duration, an abnormal non-electrical phenomenon is detected by virtue of said at least one sensor of Type 1 (excursion from the normal envelope by the amplitude of the signals representative of the measurements taken by said at least one sensor of Type 1) and when, furthermore, an abnormal electrical phenomenon is detected by virtue of said at least one sensor of Type 2 (excursion from the normal envelope by the amplitude of the signals representative of the measurements taken by said at least one sensor of Type 2).

Figure 4:
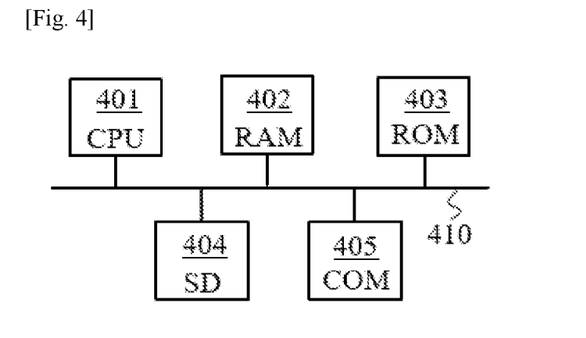
FIG. 4 schematically illustrates an example of a hardware architecture of the control unit.

FIG. 4 schematically illustrates an example of a controller hardware architecture. The exemplary hardware architecture of FIG. 4 is applicable to the first controller 210 and/or to the second controller 220 and/or to the third controller 230. Let us consider, by way of illustration, that the exemplary hardware architecture is applied to the third controller 230.

The third controller 230 then comprises, connected by a communication bus 410: a microcontroller or a processor or a central processing unit (CPU) 401; a random-access memory RAM 402; a read-only memory ROM 403, an electrically erasable programmable read-only memory (EEPROM) or flash memory for example; a storage unit 404, such as a hard disk drive (HDD), or a storage medium reader, such as a secure-digital (SD) card reader; and a communication-interface manager COM 405.

The communication-interface manager COM 405 allows the third controller 230 to communicate with the first controller 210 and the second controller 220. The communication-interface manager COM 405 allows the third controller 230 to transmit events and signals to an external unit, such as for example to an event logger LOG and/or to an avionics controller of an aircraft on board of which the electrical installation 100 is located.

The CPU 401 is capable of executing instructions loaded into the random-access memory RAM 402 from the read-only memory ROM 403, from an external memory, from a storage medium (such as an SD card), or from a communication network. When the third controller 230 is turned on, the CPU 401 is capable of reading instructions from the random-access memory RAM 402 and of executing them. These instructions form a computer program that causes all or some of the steps, operations and behaviors described here with reference to the third controller 230 to be implemented by the CPU 401.

All or some of the steps, operations and behaviors described here with reference to the first controller 210 and/or the second controller 220 and/or the third controller 230 may thus be implemented in software form via execution of a set of instructions by a programmable machine, for example a digital signal processor (DSP) or a microcontroller, or be implemented in hardware form via a dedicated component or machine, for example a field-programmable gate array (FPGA) or an application-specific integrated circuit (ASIC). Generally, the first controller 210, the second controller 220 and the third controller 230 comprise electronic circuitry designed and configured to implement, in software and/or hardware form, the steps, operations and behaviors described here.

Figure 5:
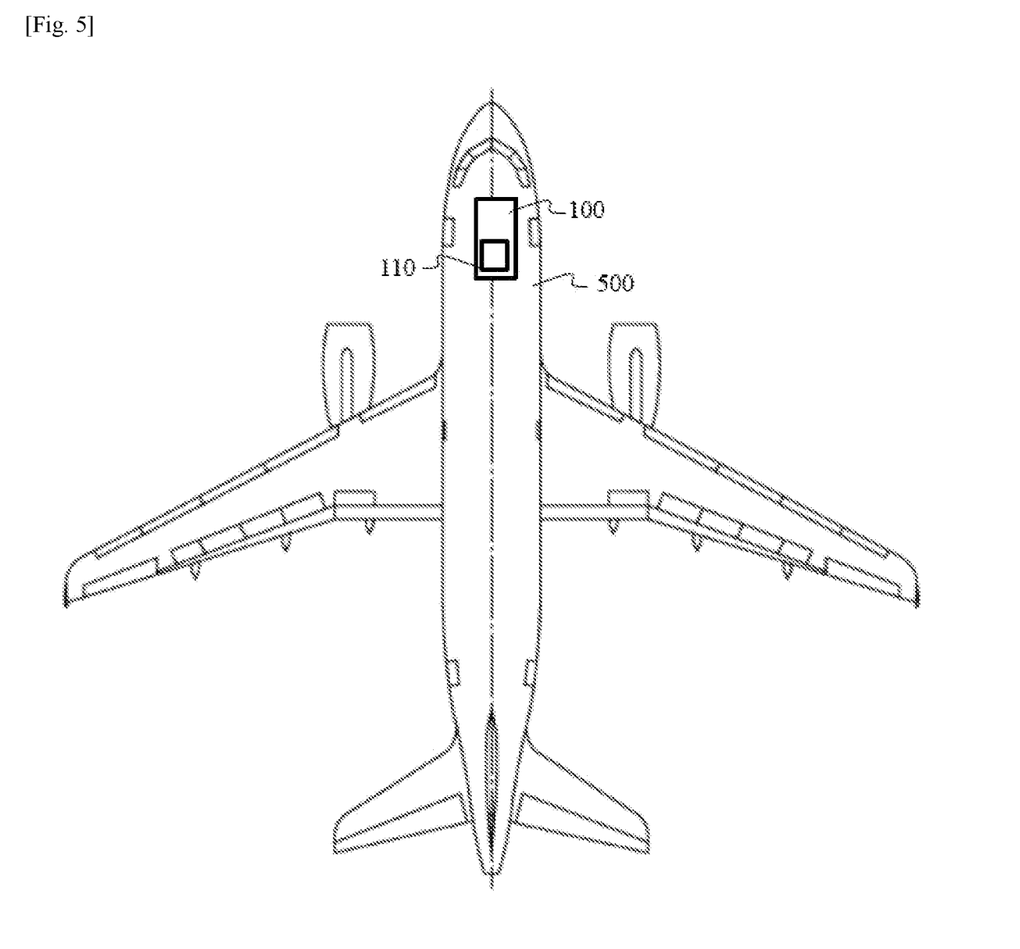
FIG. 5 schematically illustrates, seen from above, an aircraft on board of which an electrical installation protected by the electrical protection system is located.

Such as illustrated in FIG. 5, the electrical installation 100 and the electrical protection system 110 may be integrated into an aircraft 500. In one particular embodiment, when opening of the circuit breaker 170 is triggered, the avionics of the aircraft 500 switches the electrical supply of the pieces of electrical apparatus 130 to a substitute electrical installation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrical protection system for protecting a high-voltage DC electrical installation, the electrical protection system comprising:
   at least one sensor configured to perform measurements of a non-electrical physical quantity, hereinafter referred to as a non-electrical sensor;
   at least one sensor configured to perform measurements of an electrical physical quantity, hereinafter referred to as an electrical sensor; and
   a control unit connected to said at least one non-electrical sensor and to said at least one electrical sensor, the control unit comprising
      electronic circuitry configured to command a circuit breaker of the high-voltage DC electrical installation to open when, in a sliding time window, called sliding window SW3, an abnormal non-electrical phenomenon is detected by measurements of said at least one non-electrical sensor and when, furthermore, an abnormal electrical phenomenon is detected by virtue of measurements of said at least one electrical sensor.

2. The electrical protection system according to claim 1, wherein the control unit further comprises a first controller connected to each non-electrical sensor, the first controller taking a form of electronic circuitry configured to:
   perform an acquisition of values measured by each non-electrical sensor;
   determine a difference, called signal Delta T1, between the values acquired by each non-electrical sensor and a reference measurement;
   decide to generate an event internal to the control unit when, for at least one said non-electrical sensor, a signal Delta T1 exits a normal envelope, the normal envelope defining a variability of signals captured by said non-electrical sensor in nominal operation of the high-voltage DC electrical installation; and
   decide to generate an event external to the control unit when a number of internal events generated by the first controller during a sliding time window, called sliding window SW1, reaches a predefined number N1.

3. The electrical protection system according to claim 2, wherein a different external event is generated depending on whether the number N1 of internal events generated during the sliding window SW1 is reached by virtue of a single non-electrical sensor or via a plurality of non-electrical sensors.

4. The electrical protection system according to claim 2, wherein the control unit further comprises a second controller connected to each electrical sensor, the second controller taking a form of electronic circuitry configured to:
   perform an acquisition of values measured by each electrical sensor;
   determine a difference, called signal Delta T2, between the values acquired by each said electrical sensor and a reference measurement;
   decide to generate an event internal to the control unit when, for at least one said electrical sensor, a signal Delta T2 exits a normal envelope, the normal envelope defining a variability of signals captured by said electrical sensor in nominal operation of the high-voltage DC electrical installation; and
   decide to generate an event external to the control unit when the number of internal events generated by the second controller during a sliding time window, called sliding window SW2, reaches a predefined number N2.

5. The electrical protection system according to claim 4, wherein the control unit controls the circuit breaker to open when a said external event is generated by the second controller.

6. The electrical protection system according to claim 4, wherein the control unit comprises a third controller connected to the first controller and to the second controller, the third controller taking a form of electronic circuitry configured to:
   receive the internal events generated by the first controller;
   receive the internal events generated by the second controller;
   decide to generate an event external to the control unit when, during the sliding window SW3, at least one internal event is generated by the first controller and at least one internal event is generated by the second controller, and
   when, furthermore, a sum of internal events generated by the first controller and internal events generated by the second controller, in said sliding window SW3, is higher than or equal to a predefined number N3.

7. The electrical protection system according to claim 1, further comprising at least two non-electrical sensors, each detecting non-electrical phenomena of different natures.

8. An aircraft comprising:
   a high-voltage DC electrical installation equipped with an electrical protection system according to claim 1, in order to protect said high-voltage DC electrical installation.

9. A method implemented by an electrical protection system protecting a high-voltage DC electrical installation, the electrical protection system comprising: at least one sensor configured to perform measurements of a non-electrical physical quantity, hereinafter referred to as a non-electrical sensor; at least one sensor configured to perform measurements of an electrical physical quantity hereinafter referred to as an electrical sensor; and a control unit connected to said at least one non-electrical sensor and to said at least one electrical sensor, the method comprising:
   commanding, by the control unit, a circuit breaker of the high-voltage DC electrical installation to open when, in a sliding time window, called sliding window SW3, an abnormal non-electrical phenomenon is detected by measurements of said at least one non-electrical sensor and when, furthermore, an abnormal electrical phenomenon is detected by measurements of said at least one electrical sensor.

10. The electrical protection system according to claim 1, wherein the control unit further comprises a second controller connected to each electrical sensor, the second controller taking a form of electronic circuitry configured to:
- perform an acquisition of values measured by each electrical sensor;
- determine a difference, called signal Delta T2, between the values acquired by each said electrical and a reference measurement;
- decide to generate an event internal to the control unit when, for at least one said electrical sensor, a signal Delta T2 exits a normal envelope, the normal envelope defining a variability of signals captured by said electrical sensor in nominal operation of the high-voltage DC electrical installation; and
- decide to generate an event external to the control unit when the number of internal events generated by the second controller during a sliding time window, called sliding window SW2, reaches a predefined number N2.

11. The electrical protection system according to claim 10, wherein the control unit controls the circuit breaker to open when a said external event is generated by the second controller.

\* \* \* \* \*